March 3, 1970  E. GOTO  3,498,776
GLASS SEALED METAL BRIDGE SUPPORT FOR ELECTRIC TUBES OR
BULBS AND METHOD FOR MANUFACTURING THE SAME
Filed June 19, 1967
FIG. 1
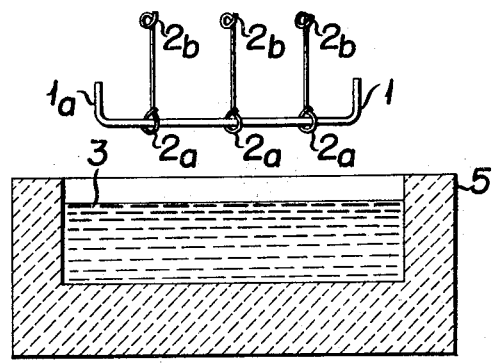
FIG. 2
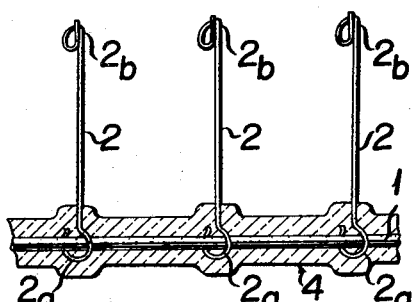
FIG. 4A
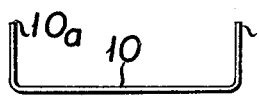
FIG. 4B
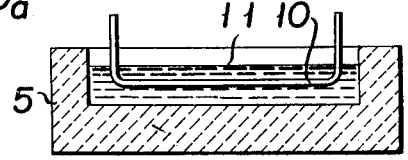
FIG. 4C
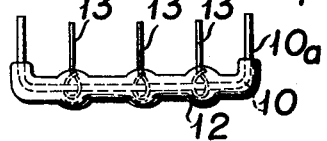
FIG. 4D
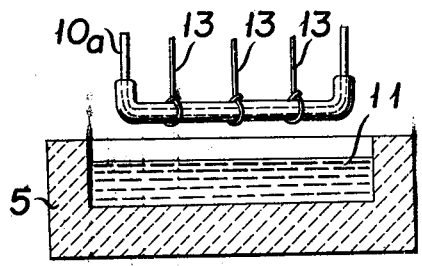
FIG. 3
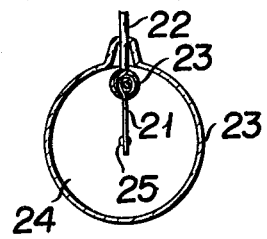
FIG. 5
FIG. 6
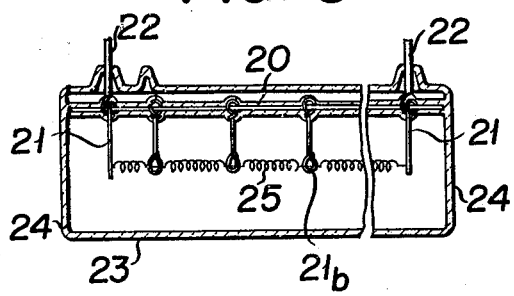
FIG. 7
BY Eizo Goto
INVENTOR.
George B. Oujevolk
attorney United States Patent Office 3,498,776
Patented Mar. 3, 1970

3,498,776
GLASS SEALED METAL BRIDGE SUPPORT FOR ELECTRIC TUBES OR BULBS AND METHOD FOR MANUFACTURING THE SAME
Eizo Goto, Chigasaki-shi, Japan, assignor to Tokyo Shibaura Electric Co., Ltd., Kawasaki-shi, Japan, a corporation of Japan
Filed June 19, 1967, Ser. No. 647,045
Claims priority, application Japan, June 21, 1966, 41/39,791, 41/39,792; Oct. 8, 1966, 41/66,030
Int. Cl. C03c 29/00
U.S. Cl. 65—59                                7 Claims

ABSTRACT OF THE DISCLOSURE

A bridge support consists of at least one supporting wire which has a bent end wrapped around a glass layer-covered core line. The bent end is fitted into the glass layer by fusion of the glass and is electrically insulated from the core line by means of a glass mass filled into the space between the core line and its supporting wire.

This bridge support can be manufactured either by dipping in a molten glass bath a core line and a supporting wire assembled in such a manner that they are not brought into contact with each other, or by first immersing said core line alone in the molten glass bath to form a glass layer on the surface of said core line and thereafter fitting the supporting wire into the glass layer by a second immersion in the bath of molten glass.

BACKGROUND OF THE INVENTION

The present invention relates to a bridge support used in supporting a filament, particularly a long one.

A filament fitted, for example, to electric tubes or bulbs is generally held at the middle part by a supporting wire commonly called anchor in order to prevent its deformation and increase its resistance to vibration. Where the filament is a relatively long one, a bridge support consisting of a plurality of supporting wires is used to hold it securely.

The plurality of supporting wires constituting the bridge support must be electrically insulated from each other at the ends opposite to the filament, so that they are fitted by fusion of the glass to a main bridge support member consisting of a solid or hollow glass rod in a perpendicular relation to said wires and with the prescribed space between them. The bridge support presently in common use is fabricated by heating with intense burner flames the prescribed parts of said main support member consisting of a glass rod, solid or hollow and having an outer diameter of 3 to 5 mm., and implanting a molybdenum supporting wire 0.1 to 0.5 mm. in diameter, then assembling each of said parts one by one by fusion of the glass while the parts are heated.

In the bridge support of the prior art manufactured in the aforementioned manner, the glass rod used as the main support member is required to have a fairly large diameter so as to display a desired mechanical strength, thus resulting in increased weight. Consequently consideration should be given to making sure that the mounting part of bulbs or tubes for supporting the bridge support are also sufficiently strong to withstand such increased weight, with the result that the completed electric bulbs or tubes become bulky. Moreover, the commonly used bridge support has the drawback that since supporting wires are implanted into the glass rod only to a slight depth they have little strength to support the filament, so that they are also liable to fall from the fused point. This type of bridge support also has further shortcomings in the manufacture of the bridge in that the use of further flames inevitably requires the control of the flames and appreciable skill in the local heating of the glass rod, and the implanting of supporting wires, one by one, reduces the work efficiency considerably.

SUMMARY OF THE INVENTION

The bridge support of the present invention comprises a glass layer-covered core line made of a heat resistant material and at least one supporting wire, one end of which is bent so as to surround the core line through a glass mass and also buried in said glass layer. The bridge support according to the present invention substantially eliminates the aforesaid drawbacks caused by implanting supporting wires directly into a pure glass rod as has been practiced in the prior art, so that it can be used in electric tubes or bulbs to great advantage.

The bridge support according to the present invention is manufactured either by bending one end of each of the desired number of supporting wires in such a manner as to surround the core line with the required space and dipping this assembly in a molten glass bath for a moment or by first dipping said core line alone in a molten glass bath to form a glass layer on its surface and thereafter winding one end each of the supporting wires about the glass layer thus formed, and again dipping this assembly in the molten glass bath so as to attach the supporting wires to said core line by fusion of the glass.

BRIEF DESCRIPTION OF THE DRAWING

FIG. 1 is a sectional side view illustrating one embodiment of the method of the present invention for manufacturing a bridge support;

FIG. 2 is an enlarged longitudinal sectional view of the bridge support manufactured by the aforementioned method;

FIG. 3 is a cross sectional view of the bridge support shown in FIG. 2;

FIGS. 4A to 4D indicate the steps of another method according to the present invention for manufacturing a bridge support, in which FIG. 4A is a side view of the core line, FIG. 4B is a sectional view showing the state of the core line dipped in a molten glass bath, FIG. 4C is a sectional view of the core line shown in FIG. 4B when it is taken out of a molten glass bath to form a glass layer, FIG. 4D is a sectional view of the glass layer-covered core line shown in FIG. 4C around which one end of the supporting wire is wound, before this assembly is again dipped in a molten glass bath.

FIG. 5 is a side view of the bridge support manufactured in the manner FIG. 4;

FIG. 6 is a longitudinal sectional view of the electric tube providing the bridge support illustrated in FIG. 5; and FIG. 7 is a cross sectional view of the electric tube shown in FIG. 6.

DETAILED DESCRIPTION OF THE INVENTION

Further description will hereinafter be given of one embodiment of the present invention with reference to FIGS. 1 to 3.

Substantially straight core line 1 made of heat resistant material used in glass seal such as a nickel-iron alloy is bent at both ends to form holding sections 1a serving as an aid in supporting the core line by a proper holding means when the core line 1 is dipped in a molten glass bath as described later. Supporting wires 2 of molybdenum are assembled to the core line 1 with a preset distance between them. One end of each of the supporting wires 2 is bent into an annular form around core line 1. The assembly is completed by fitting together said annular attaching portion 2a and core line 1 with a preset space. Said portion 2a to attach supporting wires 2 to core line 1 is not required specifically to have an annular form, but may assume various forms including the U-shape. The other ends of supporting lines 2 have bent parts 2b so as to fit them to the filament. The aforesaid assembly of core line 1 and supporting wires 2 is dipped in molten glass bath 3 contained in bath cell 5 to the extent that attaching portions 2a are fully buried in said bath, and is immediately withdrawn. This dipping permits the free space formed between a core line 1 and attaching portions 2a of supporting wires 2 to be filled with glass mass, and at the same time there is formed a glass layer 4 to be coated along the lengthwise direction of core line 1 and attaching portions, thus manufacturing a bridge support. Further description will hereafter be given of another embodiment of the present invention with reference to FIGS. 4A to D and FIG. 5. Core line 10, 0.3 mm. in diameter made of a nickel-iron alloy was bent at both ends in the same manner as in the preceding embodiment to form holding sections 10a. (FIG. 4A). Said core line 10 was dipped for about 1 second in molten glass bath 11 contained in bath cell 5 as illustrated in FIG. 4B to form glass layer 12 on the straight section of said core line 10 as shown in FIG. 4C. The glass layer coated at that time was 0.3 mm. thick. Next as illustrated in FIG. 4D, three molybdenum supporting wires 13, 0.1 mm. in diameter were fitted to glass layer-coated core line 10 at the prescribed interval by winding one end each thereof about said glass layer 12. This assembly was again dipped in molten glass bath 11 for 1 second until the part of supporting wires 13 wound about said glass layer was entirely buried in said bath. When the assembly was withdrawn the bridge support shown in FIG. 5 was obtained wherein there is one end of each of supporting wires 13 which surround core line 10 through the glass mass and this joint was further covered with another glass layer.

The aforementioned molten glass bath consisted of glass material thermally melted at about 1300° C. by introducing power through bath cell 5 wherein electrodes (not shown) were installed. The viscosity of said molten glass bath was less than 100 poises. Due to this viscosity, molten glass bath 11 enabled a glass layer about 0.3 mm. thick to be formed instantly on core line 10 by dipping it only for 1 second or less. The aforementioned glass material had a thermal expansion coefficient identical with or approximate to that of the core line.

The aforesaid bent end of the supporting wire which is associated with the core line is spaced 1.0 to 1.5 mm. from the circumference of the core line. However, since the space is filled with glass mass at the time of dip, sufficient electrical insulation is obtained. The aforesaid core line usually consists of a metal wire 0.3 to 0.5 mm. in diameter used in glass seal. However, a proper number of fine wires twisted together may be used. Such stranded wire has a relatively large surface area due to minute undulations on said surface, so that it has the advantage of obtaining the greater adhesive power of the glass layer coated thereon than in the case where the core line consists of a single wire.

In the bridge support fabricated by the aforesaid process, the bent portion of the supporting wires are fitted in the glass layer by fusion of the glass i.e., being held by the core line through glass mass, so that the supporting wires are not liable to fall from the joint. Also since the glass layer contains the core line as the center, it has an excellent mechanical strength against the tensile stress exerted by the supporting wires. The total quantity of glass required for the bridge support according to the present invention is extremely small, so that the entire weight is appreciably reduced. This is evidenced for example, by the fact that the use of glass equal to one-tenth by weight of the glass rod used in the common bridge support offers a bridge support as strong as or even stronger than has been possible with the prior art. Moreover, the present invention eliminates the necessity of demanding high skill and troublesome steps such as implanting supporting wires one by one to a glass rod by fusion of the glass as has been practiced in the prior art, and also enables a bridge support to be manufactured by a simple operation and in short time.

The bridge support according to the present invention can be mounted in electric bulbs or tubes by commonly used procedures. The present invention further offers an advantageous method for perfecting said bulbs or tubes by mounting of the aforesaid bridge support.

Further description will hereinafter be given with reference to FIGS. 6 and 7 concerning the manufacture of an electric tube using the bridge support obtained by the present invention.

First bridge support 20 obtained by the present invention is made ready for use. In this case, external lead lines 22 are connected electrically in advance to that part of supporting wires 21 at both ends of the bridge support where said supporting wires are fitted to the glass layer by fusion of the glass. A filament 25 is fitted to looped sections 21b of the bridge support so as to form a mount. This mount is inserted into a glass tube 23 open at both ends, and the supporting wires are connected to external lead lines 22 by a proper means. Then the open ends of the glass tube 23 are dipped in the molten glass bath for an instant, one after another to form glass walls 24 so as to seal these open ends and simultaneously fit both ends of said mount to said glass walls 24.

The manufacture of an electric tube by the aforesaid method makes it very easy to fit a mount into a glass tube and also reduces the weight of the electric tube due to small requirements of glass.

What is claimed is:

1. A method for manufacturing a bridge support to suspend a filament, comprising the steps of bending one end portion of a heat resistant metallic supporting wire around a metallic core line intermediate the ends thereof in generally encompassing spaced relation thereto to form a bridge support frame assembly; dipping said frame assembly into a molten glass bath so as to form a glass layer on the entire circumference of the core line at least contiguous with the bent portion of the supporting wire and at least encompassing the bent portion of the supporting wire and filling the space between the core line and the bent portion of the supporting wire; and withdrawing said assembly from said molten glass bath thereby fixing the supporting wire to the core line and providing electrical insulation between the core line and the supporting wire.

2. The method of claim 1 further comprising suspending a filament on said supporting wire, inserting said bridge support carrying said filament within a straight elongated glass tube open at both ends, such that the longitudinal axis of the bridge support lies substantially parallel to the longitudinal axis of said glass tube, dipping one open end of said glass tube in a molten glass bath to form a glass wall at said one open end so as to seal said end, dipping the other open end of said glass tube in a molten glass bath to form another glass wall at said other open end so as to seal said end thereby mounting the ends of the bridge support on said walls.

3. A method for manufacturing a bridge support to suspend a filament, comprising the steps of: first, dipping a heat resistant metallic core line into a molten glass bath to form a glass layer thereon; withdrawing said glass coated core line from the bath; bending one end of at least one metallic supporting wire around said glass coated core line intermediate the ends thereof in generally encompassing relation thereto; dipping in a molten glass bath the bent portion of the supporting wire and the glass coated core line to form another glass layer at least contiguous with the bent portion of the supporting wire and at least encompassing the bent portion of the supporting wire; and withdrawing the formed bridge support from said bath thereby fixing the supporting wire to the core line and providing electrical insulation between the core line and the supporting wire.

4. The method of claim 3 further comprising suspending a filament on said supporting wire, inserting said bridge support carrying said filament within a straight elongated glass tube open at both ends, such that the longitudinal axis of the bridge support lies substantially parallel to the longitudinal axis of said glass tube, dipping one open end of said glass tube in a molten glass bath to form a glass wall at said one open end so as to seal said end, dipping the other open end of said glass tube in a molten glass bath to form another glass wall at said other open end so as to seal said end thereby mounting the ends of the bridge support on said walls.

5. A bridge support to suspend a filament, comprising: a metallic core line of heat resistant material; at least one metallic supporting wire having an end portion bent around the core line intermediate the ends thereof in generally encompassing spaced relation thereto; a glass layer formed on the entire circumference of said core line at least contiguous with the bent portion of the supporting wire and at least encompassing the bent portion of the supporting wire and filling the space between the core line and the bent portion of the supporting wire thereby fixing the supporting wire to the core line and providing electrical insulation between the core line and the supporting wire.

6. The bridge support claimed in claim 5 wherein said metallic core line consists of a plurality of fine metallic wires twisted together.

7. An electric tube comprising a glass tube with ends; a bridge support mounted in said glass tube between said ends, said support consisting of a metallic core line of heat resistant material, at least one metallic supporting wire having an end portion bent around the core line intermediate the ends thereof in generally encompassing spaced relation thereto, a glass layer formed on the entire circumference of said core line at least contiguous with the bent portion of the supporting wire and at least encompassing the bent portion of the supporting wire and filling the space between the core line and the bent portion of the supporting wire thereby fixing the supporting wire to the core line and providing electrical insulation between the core line and the supporting wire, and a filament suspended by the other end of said metallic supporting wire.

References Cited
UNITED STATES PATENTS

| | | | |
|---|---|---|---|
| 1,800,037 | 4/1931 | Wiegand | 313—276 |
| 2,145,912 | 2/1939 | Anderson | 313—276 |
| 2,712,089 | 6/1955 | Lamb | 313—276 |
| 2,790,924 | 4/1957 | Skehan | 313—273 |
| 2,941,279 | 6/1960 | Freedman | 65—59 |
| 3,167,418 | 1/1965 | Hopkins | 65—59 |

S. LEON BASHORE, Primary Examiner

E. R. FREEDMAN, Assistant Examiner

U.S. Cl. X.R.

29—472.9; 65—42, 43, 60, 139, 154, 166; 117—128, 129; 313—276